UNITED STATES PATENT OFFICE.

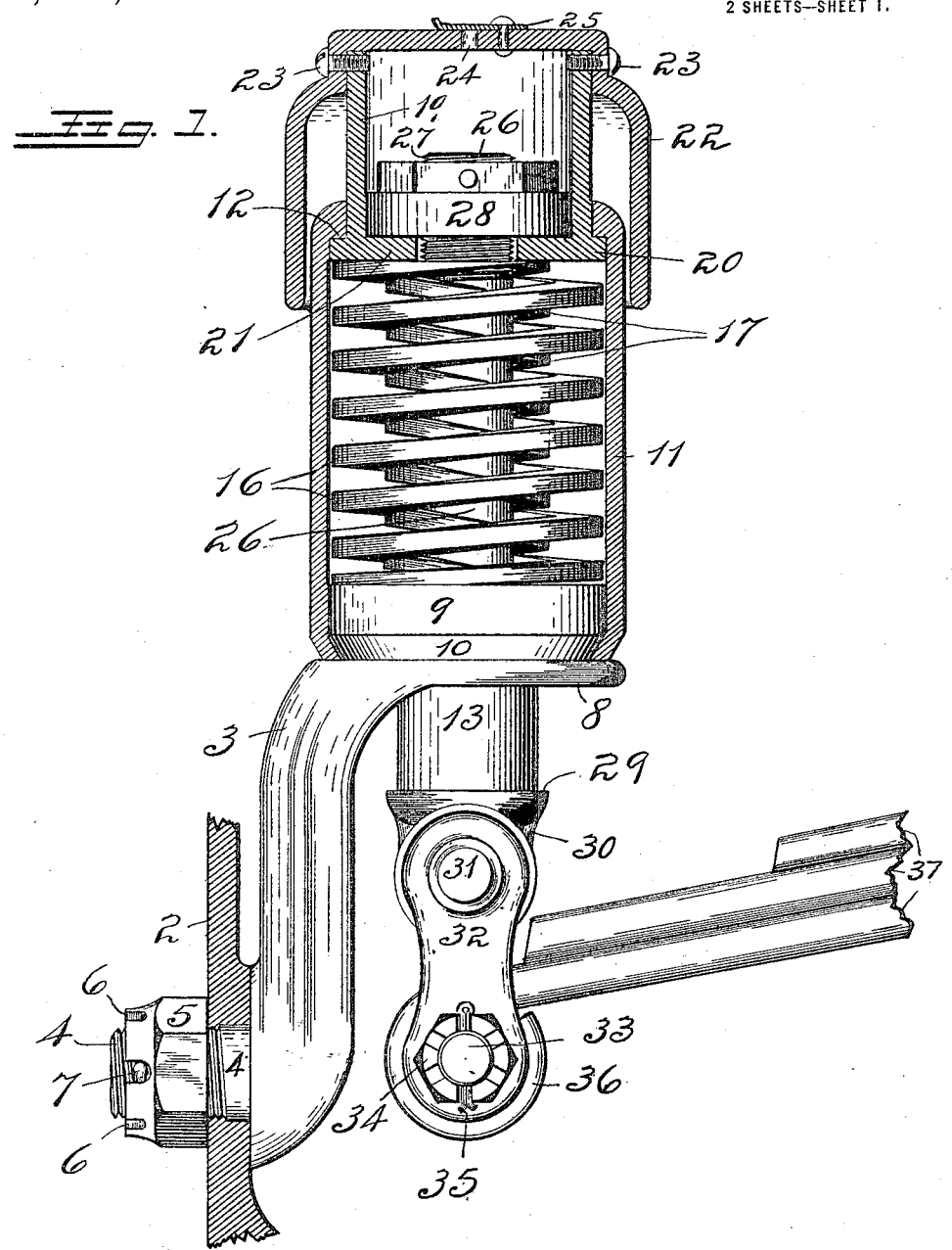

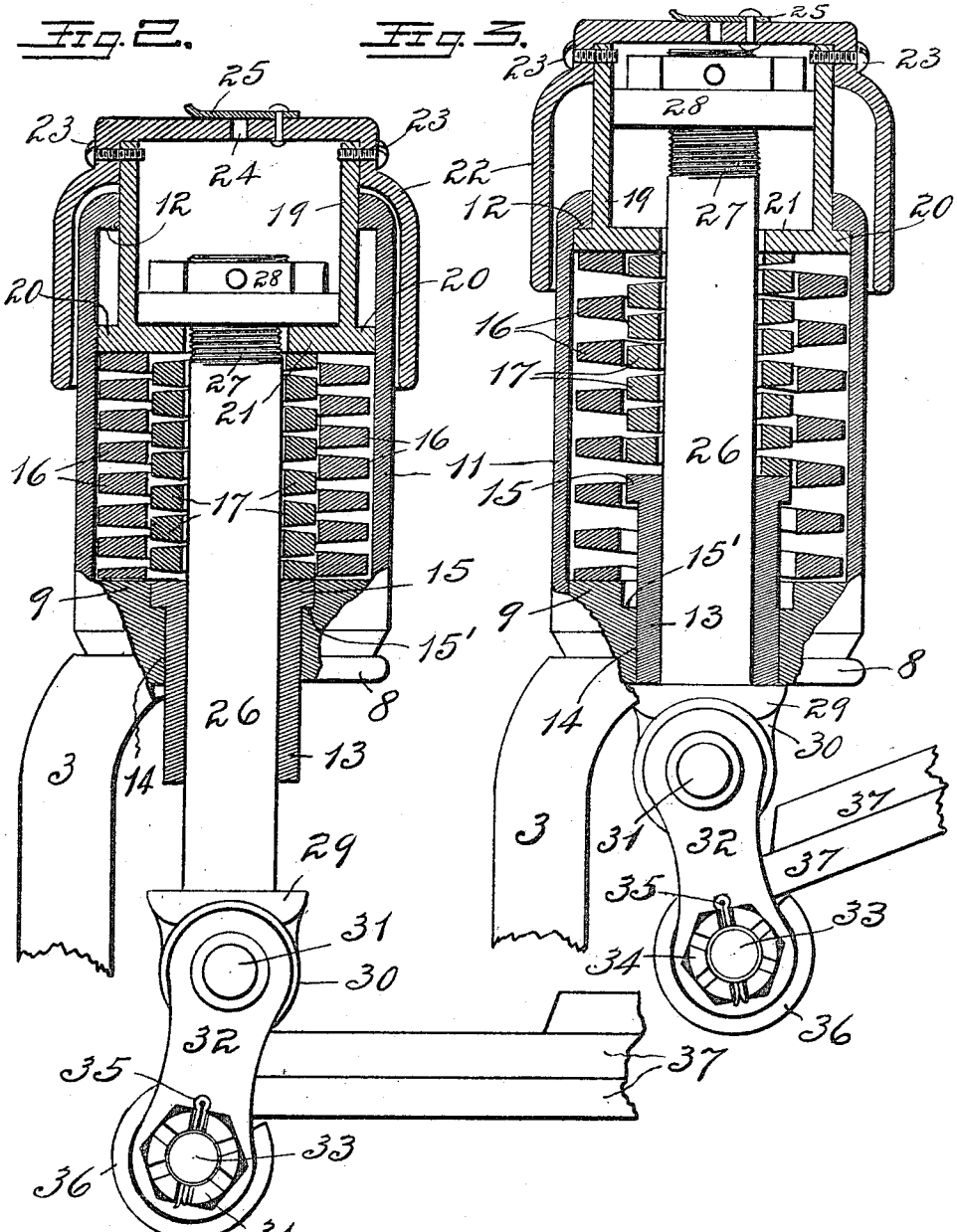

GEORGE G. BAYNE, OF QUINCY, ILLINOIS.

SHOCK AND REBOUND ABSORBER.

1,214,120.      Specification of Letters Patent.      Patented Jan. 30, 1917.

Application filed March 20, 1916. Serial No. 85,399.

*To all whom it may concern:*

Be it known that I, GEORGE G. BAYNE, a citizen of the United States, (whose post-office address is Quincy, Adams county, Illinois,) have invented a new and useful Shock and Rebound Absorber, of which the following is a specification.

My present invention relates to devices attachable to automobiles and adapted to absorb the shock incident to the downward movement of the vehicle body, and for absorbing the return or rebound movement of said body.

The primary object of the invention is to provide a device which will effectively accomplish both of said functions.

Another object is to so construct the device that it is dirt, dust and moisture proof.

Another object is to so construct the device that the interiorly arranged parts may be readily oiled.

Another object is to so construct the head of the supporting bracket that the cylinder or casing may be effectively and rigidly secured thereto.

A special object is to provide a spring novel to this art.

Still another object is to provide a novel casing cap.

Another object consists in providing novel constructions and combinations of elements.

Minor objects will appear. Some of these will be obvious and others particularly referred to.

The principal object of the invention, concisely stated, is, therefore, to generally improve the construction and increase the capacity, utility and efficiency of devices of this nature.

The invention consists, substantially, in the improvements hereinafter described.

In the accompanying drawings, which illustrate a preferred embodiment of my invention, Figure 1 is a front elevation, partly in section, the parts shown as in normal position; Fig. 2, a similar view, but the parts in extreme down-thrust positions; and Fig. 3, a similar view, the parts in extreme up-thrust positions.

Coming now to a detailed description of the drawings and referring to each element and, where necessary, to each part thereof, by a distinguishing reference numeral, uniformly employed, 2 designates a part of the frame or chassis of an automobile, for which, of course, any other part of a vehicle might be substituted.

3 designates a bracket having a stem 4 which passes through an aperture in said piece 2 and is secured thereon by a nut 5 having recesses for the reception of a locking cotter 7 which passes through said stem. The head 8 of the bracket has an annular, axially apertured projection 9 and its lower edge is conical or undercut as shown at 10. For the purposes of this specification the head 8 may be termed a base.

11 designates a cylindrical casing the lower end of which is crimped tightly and rigidly around the cone 10. The upper edge of the cylinder is inwardly flanged to provide an abutment 12.

13 designates a staff-guide or bearing-sleeve slidably or reciprocally mounted in the axial base 14 in the head 8—9—10 and having a supporting flange 15 which seats on a shoulder 15' in said head.

16 designates an outer and 17 an inner coil spring, both of which are adapted to operate by compression. The former seats on the projection 9 and the latter on the flange 15 of the sleeve 13.

19 indicates a compression sleeve having an outturned flange 20 adapted to strike the abutment 12 as the sleeve moves upward.

21 designates an inturned flange on said sleeve, this flange being contacted by the spring 17 while the flange 20 is contacted by the spring 16.

22 designates the top or cap, removably secured to the sleeve 19 by screws 23. It is provided with an oil-hole 24 covered by a spring-clip 25.

26 indicates a staff or plunger having threads 27 on its upper end. 28 indicates a nut engaging said threads and resting on the flange 21 of the sleeve 19. 29 designates an annular sleeve-lifting boss, and 30 an extension or foot provided with a transverse aperture which receives a bolt 31 by means of which said staff is pivotally engaged with one end of a link 32 the other end of which is engaged by means of a bolt 33, nut 34 and cotter 35 with the eye 36 of the vehicle spring 37.

Assume the parts to be in the normal positions shown in Fig. 1. When the weight comes upon the staff 26 the nut 28 will bear downward on the flange 21 to cause the sleeve 19 to compress both springs, 16 and 17, which thus receive a portion of the weight of the vehicle body, whereby the shock is absorbed, this movement and function being clearly illustrated by Fig. 2.

In the rebound movement, shown in Fig. 3, as the vehicle spring 37 commences to return it will force the staff 26 toward its normal position and the shoulder 29 will strike the sleeve 13 and raise it to thereby compress the spring 17 against the flange 21 which meanwhile has been returned to its normal position by reason of the spring 16 expanding and carrying the sleeve 19 to its normal position. When this operation has been completed the spring 17 will exert its stored energy (in expanding) and will return the bearing-sleeve 13 to its normal position.

Having thus described my invention, I claim as new the following, to-wit:

1. In a device of the character described, a base, a casing secured thereto, its upper end provided with an abutment, a bearing-sleeve reciprocable in said casing and having a flange normally resting on said base, a compression-sleeve reciprocable in said casing and having a flange normally contacting said abutment, means for operating said sleeves, and a spring compressible by said sleeves.

2. In a device of the character described, a base, a casing secured thereto, its upper end provided with an abutment, a bearing-sleeve reciprocable in said casing and having a flange normally resting on said base, a compression-sleeve reciprocable in said casing and having a head normally contacting said abutment, an absorber-spring compressible by said sleeves, a vehicle-spring, and means operable by the vehicle-spring for operating said sleeves.

3. In a device of the nature described, a base, a casing secured thereto, its upper end provided with an abutment, a bearing-sleeve reciprocable in said casing and having a flange normally resting on said base, a compression-sleeve reciprocable in said casing and having a flange normally contacting said abutment, an absorber-spring interposed between said sleeves, vehicle-spring-actuated means for operating the compression-sleeve to cause it to compress said spring, and vehicle-spring-actuated means for operating the bearing-sleeve to cause it to compress said absorber-spring.

4. In a device of the character described, a base, a casing secured thereto, its upper end provided with an abutment, a bearing-sleeve reciprocable in said casing and having a flange normally resting on said base, a compression-sleeve reciprocable in said casing and having a head normally contacting said abutment, an absorber-spring compressible by said sleeves, a staff penetrating both of said sleeves and movable therethrough, and a vehicle spring connected with said staff, the reciprocating movements of said staff and means associated therewith adapted to operate said sleeves whereby to compress said absorber spring.

In testimony whereof I hereto affix my signature this 29th day of February, 1916.

GEORGE G. BAYNE.

Copies of this patent may be obtained for five cents each, by addressing the "Commissioner of Patents, Washington, D. C."